United States Patent
Fukano

(10) Patent No.: US 6,910,817 B2
(45) Date of Patent: Jun. 28, 2005

(54) PRINTING APPARATUS, PRINTING SYSTEM, AND PRINTER CONTROL METHOD

(75) Inventor: Kazuko Fukano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/868,652

(22) Filed: Jun. 15, 2004

(65) Prior Publication Data

US 2005/0013643 A1 Jan. 20, 2005

(30) Foreign Application Priority Data

Jun. 19, 2003 (JP) ........................................ 2003-175019

(51) Int. Cl.[7] .............................................. B41J 11/44
(52) U.S. Cl. .............................. 400/76; 400/70; 400/61
(58) Field of Search .............................. 400/76, 70, 61

(56) References Cited

U.S. PATENT DOCUMENTS

| 6,132,117 A | 10/2000 | Fukano et al. |
| 6,491,453 B1 | 12/2002 | Fukano et al. |

FOREIGN PATENT DOCUMENTS

| EP | 1106368 A2 * | 6/2001 | ............. B41J/3/44 |
| JP | 8-328786 | 12/1996 | |
| JP | 10-232752 | 9/1998 | |
| JP | 11-99730 | 4/1999 | |
| JP | 11-268384 | 10/1999 | |
| JP | 2001-147867 | 5/2001 | |

OTHER PUBLICATIONS

English Abstract for JP2005–007762A.*

* cited by examiner

Primary Examiner—Charles H. Nolan, Jr.
(74) Attorney, Agent, or Firm—Rosalio Haro

(57) ABSTRACT

Data in the host device that was processed before a data interrupt process could run, and data that was already being sent to the printer, can be reliably deleted when an error occurs. A printing apparatus 20 having a normal processing mode for storing data sent from a host device 10 to a receive buffer 242 and running a printing process based on the data in the receive buffer 242, and a deletion processing mode for clearing data in the receive buffer 242, has: a processing mode selection means 43 for selecting one of a first processing mode for saving data in the receive buffer 242 and print buffer 245, and not changing to the deletion processing mode, when a printing apparatus 20 error is detected in the normal processing mode; a second processing mode for clearing all data in the receive buffer 242 and print buffer 245, and changing to the deletion processing mode, when a printing apparatus 20 error is detected in the normal processing mode; and a third processing mode for clearing data in the print buffer 245 and saving data in the receive buffer 242, and changing to the deletion processing mode, when a printing apparatus 20 error is detected in the normal processing mode.

17 Claims, 14 Drawing Sheets

ERROR STATE MODE SELECTION COMMAND
    ESC A m1 m2
        m1 = 0: DO NOT ENTER DELETION PROCESSING MODE
        m1 = 1: CLEAR ALL UNPRINTED DATA, THEN ENTER DELETION
                PROCESSING MODE
        m1 = 2: SAVE DATA IN RECEIVE BUFFER, AND ENTER DELETION
                PROCESSING MODE
        m2 = 0: DO NOT SEND THE MODE_CHANGE RESPONSE
        m2 = 1: SEND THE MODE_CHANGE RESPONSE

FIG. 5A

RESUME_PRINTING COMMAND
    ESC B d1···dk
        d1···dk: DESIRED KEYWORD

FIG. 5B

PROCESSING MODE CONFIRMATION COMMAND
    ESC C m
        m = 1: REQUEST PROCESSING MODE CONFIRMATION

FIG. 5C

STARTUP PROCESSING MODE SELECTION COMMAND
    ESC D m
        m = 0: START IN NORMAL PROCESSING MODE
        m = 1: START IN DELETION PROCESSING MODE

FIG. 5D

PRINTING APPARATUS, PRINTING SYSTEM, AND PRINTER CONTROL METHOD

BACKGROUND OF THE INVENTION

1. Field of the Invention

The present invention relates to a printing apparatus for printing according to data sent from a host device, to a printing system, and to a printing apparatus control method.

2. Description of the Related Art

When a problem occurs in a printer connected to a host device, the printer conventionally run an error recovery process such as outlined below and taught in JP-11-268384.

(1) When the problem occurs, the printer sends a status report to the host and then goes off-line. The status report identifies the cause of the printer going off-line, such as there being no paper or the cover being opened, or the cause of the error, such as a paper jam.

(2) When the host device receives the error status report from the printer, it interrupts data transmission from the application program to the printer, and destroys any unsent data (the data stored in a data buffer managed by the application).

(3) When the printer confirms that the error has been resolved, it sends an error recovery status report to the host device, destroys any unprinted data in the receive buffer and print buffer, and goes back on-line.

(4) When the host device receives the error recovery status report from the printer, it resumes data transmission from the application starting from the beginning of the data that was being sent when the error occurred.

A problem with this error recovery process is that if the printer error is corrected before data transmission by the application stops, that is, if step (3) above is processed before step (2) is completed, data that was being sent and data that was output before data transmission could be interrupted in step (2) is left in the printer.

This is described more specifically with reference to FIG. 14A. Data sent from the host 510 is sent from the application data buffer 511 managed by the application program through the OS transmission buffer 512 managed by the operating system (OS) to the receive buffer 521 of the printer 520 through an interface not shown. If data remains in the OS transmission buffer 512 or the application data buffer 511 when an error occurs on the printer side, the printer prints unwanted (unnecessary) data after the printer 520 problem is corrected because the data stored in buffer 511 or 512 cannot be erased or the interrupt process halting data transmission is not executed in time. This wastes paper or other printing medium and ink, and thus wastes resources.

In a POS system (point-of-sale data management system) used in convenience stores and other retail businesses, data is sent from the host 510 (cash register terminal) through a POS server 530 to the printer 520 (receipt printer) as shown in FIG. 14B, and data accumulated in the data buffer 531 of the POS server 530 can also produce wasted printouts. How to efficiently delete data accumulated in these four buffers 511, 512, 521, and 531 shown in FIG. 14 is therefore a significant problem.

A function for sending a clear buffer request to the OS transmission buffer 512 and data buffer 531 of the POS server 530 to delete buffered data could be provided to solve this problem, but implementing this function is complicated. Applying a hardware reset to the POS server 530 is also possible, but when multiple POS terminals are connected to the POS server 530, for example, resetting the server interrupts processing by all POS terminals, and this method is therefore not practical.

SUMMARY OF THE INVENTION

The present invention is therefore directed to solving this problem by providing a printing apparatus, printing system, and printer control method that, when an error occurs on the printer side and there is data that is being transmitted or data on the host side that was not stopped by the data interrupt process, can reliably eliminate said data and thereby prevent unwanted printing.

To achieve this object, a printing apparatus according to the present invention having a normal processing mode for storing data sent from a host device to a receive buffer and running a process based on the data in the receive buffer, and a deletion processing mode for clearing data in the receive buffer, includes: a processing mode selection means for selecting one of a first processing mode for saving data in the receive buffer and print buffer, and not changing to the deletion processing mode, when a printing apparatus error is detected in the normal processing mode; a second processing mode for clearing all data in the receive buffer and print buffer, and changing to the deletion processing mode, when a printing apparatus error is detected in the normal processing mode; and a third processing mode for clearing data in the print buffer and saving data in the receive buffer, and changing to the deletion processing mode, when a printing apparatus error is detected in the normal processing mode.

The invention enables selecting the appropriate error state mode according to the application type and user-desired print results. For example, if the first error state mode is selected, continuous printing is possible because the paper is not cut (segmented) when a printer error occurs. It is therefore not necessary to resend the data, and paper is not wasted.

Furthermore, if the second error state mode is selected, data in the receive buffer is erased without parsing them when the deletion processing mode is activated, and the time required to delete data in the deletion processing mode can be shortened. Furthermore, if the application being used monitors the printer status, control that does not embed a resume_Printing command in the erased data is possible because the application monitors the printer status while processing data.

Furthermore, if the third error state mode is selected, the deletion processing mode is activated while saving the data in the receive buffer. It is therefore possible to change to the normal processing mode by means of the resume_printing command when the resume_printing command is contained in data that was not stopped by the data transmission interrupt process of the host device or data that was already being sent. While more time is therefore required for the deletion processing mode to delete data in the receive buffer, particularly when much data is left in the receive buffer, data processing by applications that do not monitor the printer status can continue without interference. Furthermore, if data is printed according to print data having a resume_ printing command embedded on each page, printing can be resumed from the page following the page being printed when the error occurred.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 5A to 5D show sample control command statements.

DESCRIPTION OF THE PREFERRED EMBODIMENTS

Preferred embodiments of the present invention are described below with reference to the accompanying figures.

When a printer or, more generally a printing apparatus, that is used connected to a host device detects a problem on the printing apparatus side, such as an error or the printing apparatus going off-line, the invention enables the printing apparatus to enter a deletion processing mode. This deletion processing mode deletes data, including print data and commands other than certain specific commands. As a result, if there is any data that the data transmission interrupt process of the host was too late to stop, or that had already been sent from the host when the error occurred or the printing apparatus went off-line, unnecessary printing processes, will not be applied to such data.

The deletion processing mode can be terminated by sending from the host a resume printing command. In other words, because the host device can control resuming the normal processing mode, the printer can reliably delete unprocessed data (data that the host device seeks to delete) that has not been completely processed.

A printing apparatus and printing system according to the present invention is described below using by way of example a host device (cash register terminal) and printer (receipt printer) used in a POS system. A program according to the present invention as described in the accompanying claims enables a host device and printer according to the present invention to function, and detailed description of this program is omitted below. Furthermore, a printer control method according to the present invention is also described as part of the printer description below, and separate description of the printer control method is therefore also omitted.

Figure 1:
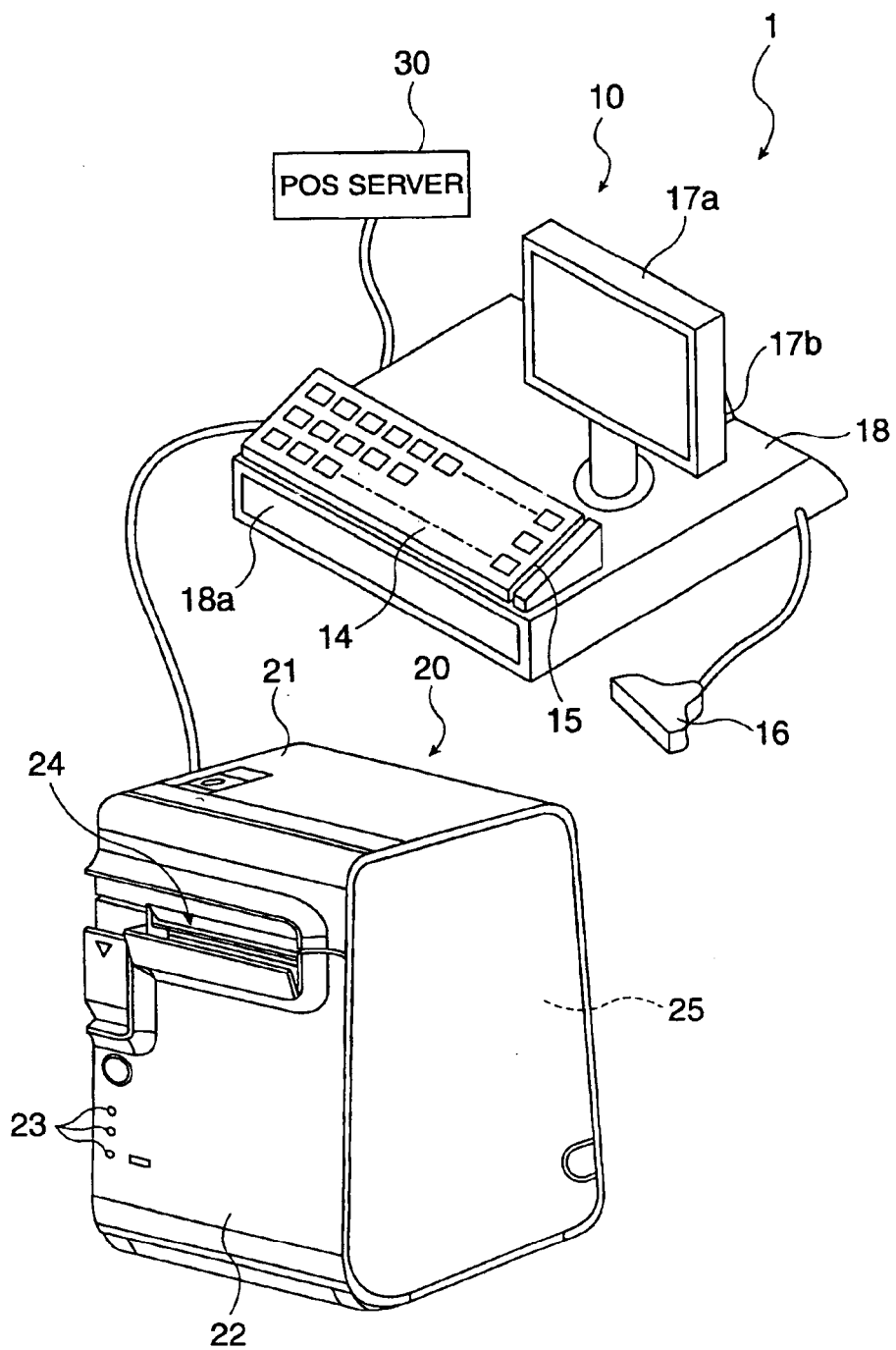
FIG. 1 shows the configuration of a printing system according to a preferred embodiment of the present invention.

FIG. 1 shows the configuration of a printing system 1 (POS system) according to a preferred embodiment of the present invention. As shown in the figure a printing system 1 according to this embodiment includes at least one host device 10 and printer 20, and a POS server 30. The host 10 executes a transaction process according to product information input by an operator, and generates print data used for printing sales receipts, a journal, and validation slips, for example. The printer 20 prints according to control data and print data sent from the host 10. Plural hosts 10 (POS terminals in this embodiment), of which only one is shown in FIG. 1, are typically connected to the POS server 30, which serves and controls the hosts 10. One host 10 and printer 20 together constitute one POS terminal operated by a single operator.

The host 10 has a keyboard 14 located at the top front of a case 18 and used by the operator to enter product information, an operator display 17a at the rear right-hand part of the case 18 enabling the operator to confirm the entered data, and a cash drawer 18a inside the case 18. A barcode scanner 16 for reading barcodes on the products is connected to the right-hand side of the case 18, and a card reader 15 with a slot for reading customer credit cards, for example, is disposed at the right-hand side of the keyboard 14 in this system. A customer display 17b enabling the customer to confirm the entered product information is also located on the rear side of the case 18.

The host 10 generates print data based on the information input via the keyboard 14 or the barcode scanner 16, and sends the print data through the POS server 30 to the printer 20. The host 10 receives status reports and responses from the printer 20 to monitor the status of the printer 20, including if an error has occurred and the processing mode (normal processing mode or deletion processing mode, described further below), and sends control data and commands to control the printer 20.

The printer 20 has a case 21 with an open front, and a cover 22 for opening and closing the front opening. When the cover 22 is open, continuous paper P can be loaded and the inside of the printer can be accessed for maintenance and inspection. The continuous paper P is typically in a roll, and is stored in a paper storage unit 25 inside the printer. The free end of the roll paper P is delivered out of the case 21 through a paper exit 24 formed in the cover 22. A paper cutter mechanism (not shown) is disposed on the inside of the paper exit 24.

The printer 20 is connected to the host 10 through a cable and connector, for example, and controls printing (printing process) according to print commands from the host 10. That is, a print head 122 (inkjet head) and an ink supply unit 125 are controlled according to commands from the host 10 to print characters (such as letters and symbols) and images (such as a logo), while a paper feed motor 124 is driven to convey the roll paper P toward the paper exit 24 (see FIG. 4). When printing is completed, the roll paper P is fed until the trailing end of the printed part reaches the cutting position of the paper cutter. A paper cutter motor 131 is then driven to cut the paper by means of a paper cutter 132 (see FIG. 4) so that the printed paper can be removed from the paper exit 24 and given to the customer.

Multiple LEDs 23 are located at the front of the case 21 to indicate the cause of particular problems inside the printer 20. The LEDs 23 are driven to light steadily or to blink according to the particular problem or error, including when there is no paper in the paper storage unit 25, the ink supply is depleted, a paper jam occurs, or another error occurs that prohibits or makes it difficult to continue printing.

Figure 2:
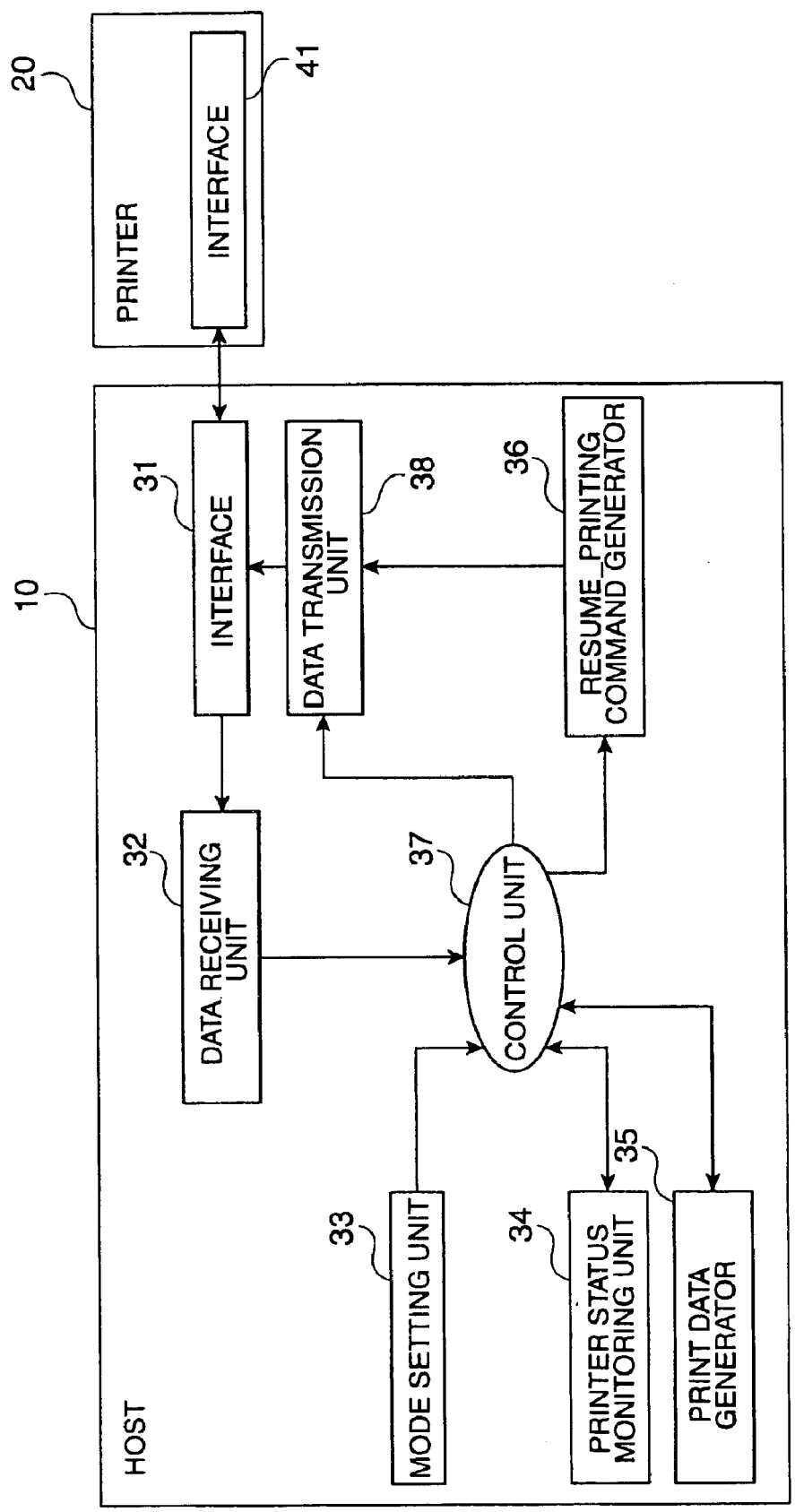
FIG. 2 is a function block diagram showing the control configuration of the host.
Figure 3:
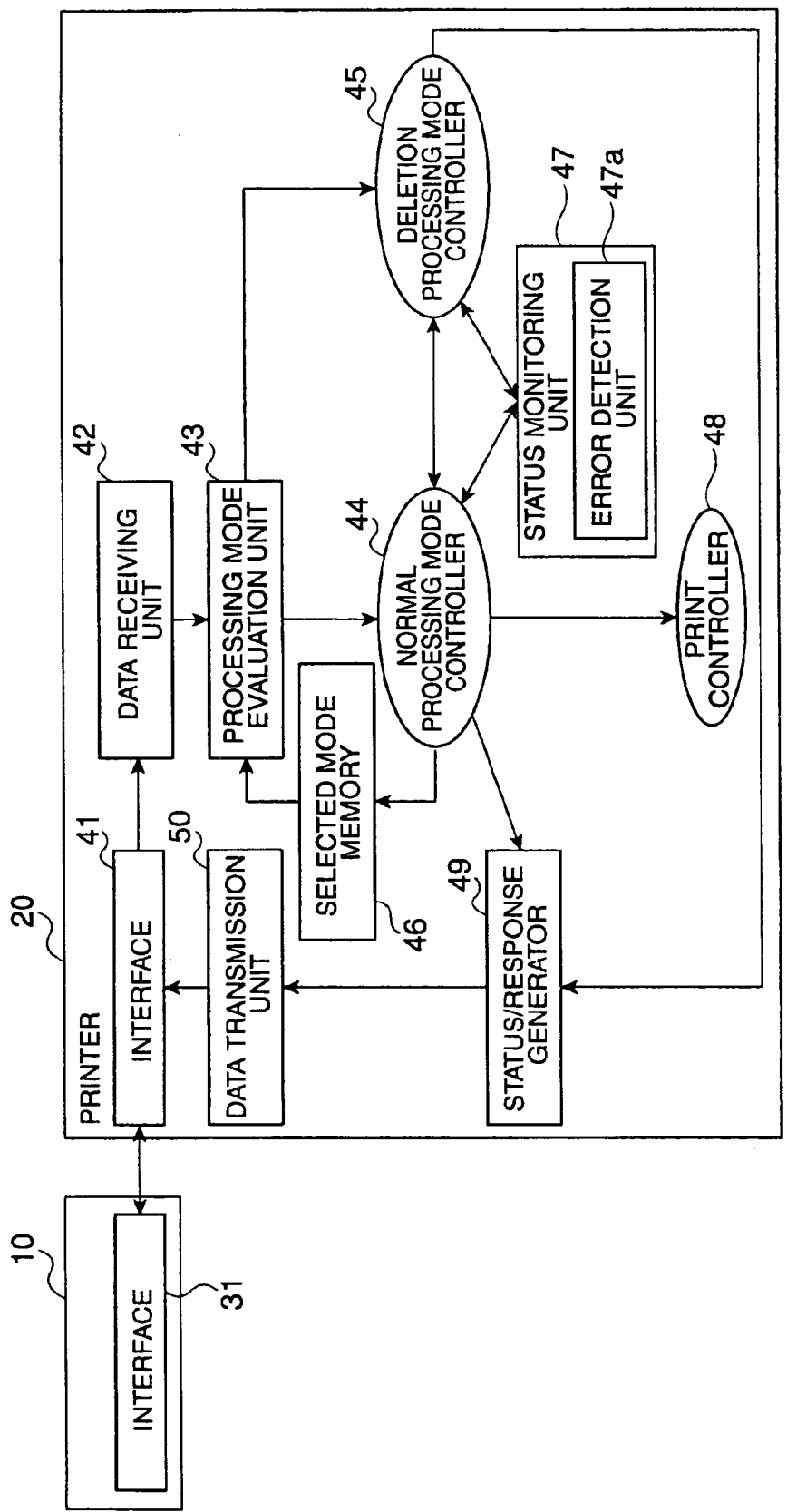
FIG. 3 is a function block diagram showing the control configuration of the printer.
Figure 4:
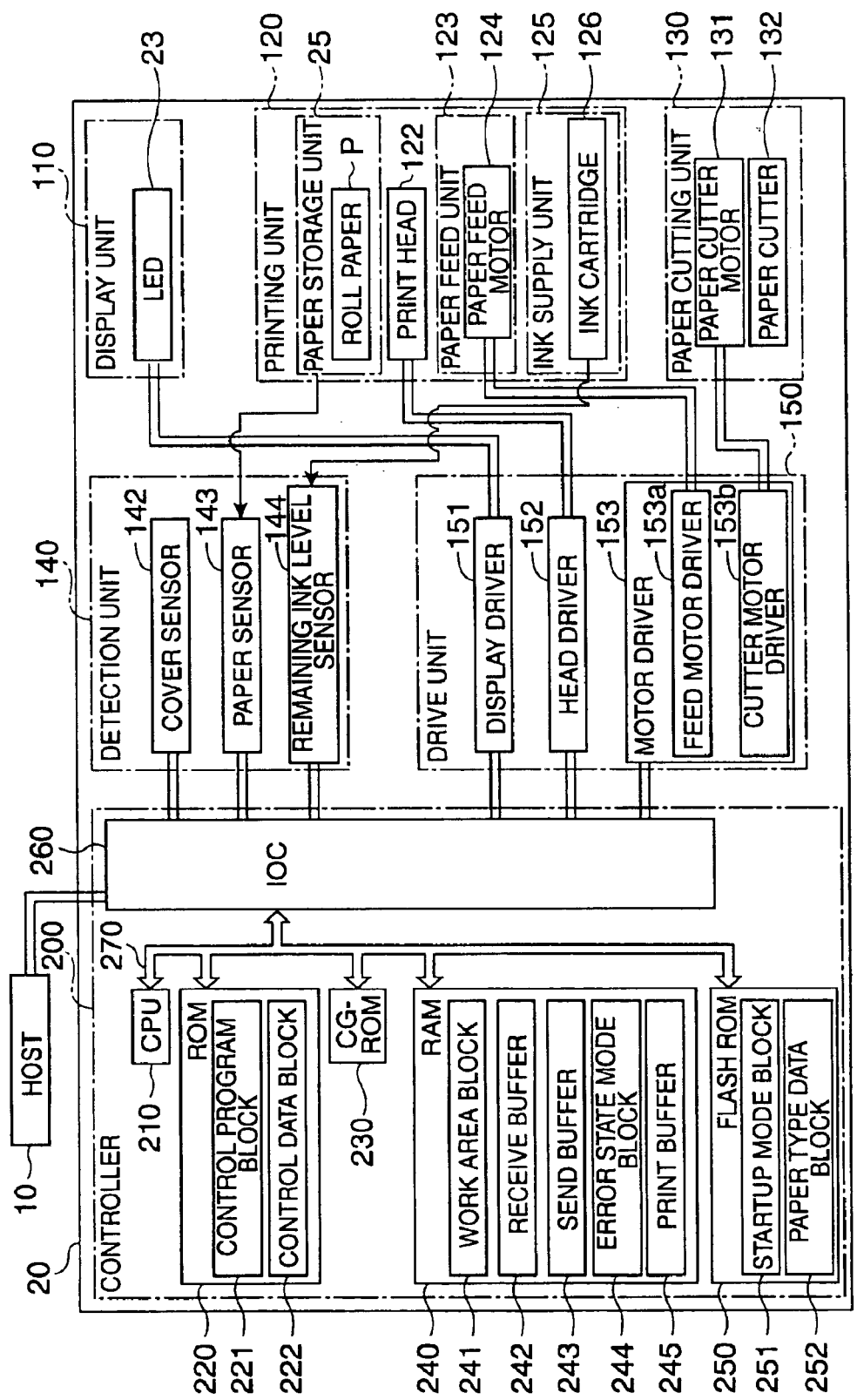
FIG. 4 is a control block diagram showing the control configuration of the printer.

The control configuration of this host 10 and printer 20 is described next with reference to FIG. 2 to FIG. 4. FIG. 2 is a function block diagram of the host 10, FIG. 3 is a function block diagram of the printer 20, and FIG. 4 is a control block diagram of the printer 20. The control configuration of the host 10 is described first with reference to FIG. 2.

As shown in FIG. 2, the host 10 has an interface 31 for data communication with the printer 20; a data receiving unit 32 functioning as a receive buffer for storing status reports, responses, and other data from the printer 20; a mode setting unit 33 for running mode selection processes, including generating commands for setting either the normal processing mode or the deletion processing mode as the operating mode when the printer 20 starts up or an error occurs; a monitoring unit 34 for monitoring the printer status based on status data and responses from the printer 20; a print data generator 35 for generating print data for printing roll paper P; a resume_printing command generator 36 for generating a resume_printing command to terminate the deletion processing mode in the printer 20; a control unit 37 for controlling operation of the host 10; and a data transmission unit 38 for sending commands and print data, and functioning as a data buffer managed by the application and transmission buffer managed by the OS.

The monitoring unit 34 monitors the condition of the printer 20, such as whether the paper or ink supply has run out, by receiving so-called ASB (Automatic Status Back) reports from the printer 20. The progress of data processing in the printer 20 is also monitored using a process ID response, a start_deletion_process response, an end_deletion_process response, and a power-on report.

The ASB function automatically reports to the host 10 when there is a change in certain printer state information.

The process ID response is a response sent according to the process ID inserted optionally by the host 10 in control commands or print data and sent to the printer 20, and indicates that the control command or print data was processed by the printer 20. This enables the host 10 to send data synchronized to the internal status of the printer 20.

The start_deletion_process response and end_deletion process response are responses indicating that the deletion processing mode in the printer 20 started or stopped, respectively. The end_deletion_process response therefore also indicates the normal processing mode was resumed. These responses enable the host 10 to know the current processing mode of the printer 20. The printer processing modes and these responses are described in further detail below.

The power-on report indicates that the initialization process has been completed that is run when power to the printer 20 is turned on and the printer starts up, and the host 10 can then determine the printer condition.

When the printer 20 is set to the normal processing mode, the control unit 37 runs the normal operating process (sending print data and control commands). When the monitoring unit 34 detects that the printer 20 has entered the deletion processing mode (that is, detects the start_deletion_process response), the control unit stops any data transmission process currently running. When an error recovery status report is received from the printer 20, processing passes to the resume_printing command generator 36 and a resume_printing command is output. When the monitoring unit 34 then detects that the printer 20 resumed the normal processing mode (that is, detects the end_deletion_process response), the print data transmission process is resumed.

The control configuration of the printer 20 is described next with reference to FIG. 3. As shown in FIG. 3, the printer 20 has an interface 41 for data communication with the host 10; a data receiving unit 42 functioning as a receive buffer for storing received print data and control commands that are not to be executed immediately; a processing mode evaluation unit 43 for determining the processing mode based on resume_printing commands received from the host 10 and printer error detection, and passing control to the normal processing mode controller 44 or deletion processing mode controller 45 (described below) according to the identified processing mode; a normal processing mode controller 44 for controlling the printer when the normal processing mode is identified by the processing mode evaluation unit 43; a deletion processing mode controller 45 for controlling the printer when the deletion processing mode is identified by the processing mode evaluation unit 43; a selected mode memory 46 for storing the setting (command) from the host 10 that determines the processing mode to be executed when an error occurs and when the printer starts up; a status monitoring unit 47 for detecting the state of a cover sensor 142, a paper sensor 143, and a remaining ink level sensor 144 (shown in FIG. 4), having an error detection unit 47a for detecting if there is an error in the printer 20, and monitoring whether the printer 20 can continue printing; a print controller 48 functioning as a print buffer for storing image data based on print data sent from the host 10, and controlling printing; a status/response generator 49 for generating the status and response data sent to the host 10; and a data transmission unit 50 functioning as a transmission buffer for storing data to be sent to the host 10, including the status and response data generated by the status/response generator 49.

The normal processing mode controller 44 processes print data and commands received from the host 10, and passes control to the deletion processing mode controller 45 when a problem occurs in the printer 20 and the deletion processing mode has been selected for this case as will be explained in detail later. If a resume_Printing command is received during normal processing mode control, the normal processing mode controller 44 deletes the resume_printing command.

When operation passes to the deletion processing mode, the deletion processing mode controller 45 sends a start_deletion_process response to the host 10, and when a resume_printing command is received from the host 10, the deletion processing mode controller 45 returns an end_deletion_Process response and passes control back to the normal processing mode controller 44. The deletion processing mode controller 45 executes only specific commands intended for execution in the deletion processing mode, and deletes any other commands or print data received. The specific commands executed by the deletion processing mode controller 45 include the resume_printing command, processing mode inquiry (whether the current processing mode is the normal processing mode or the deletion processing mode) commands, printer status request command, and an error recovery command for recovering from a paper jam or other error.

The status/response generator 49 generates the ASB status report for reporting the printer status detected by the status monitoring unit 47, and various responses reporting the data processing state. These responses include the process ID response, start_deletion_process response, end_deletion_process response, and power-on report.

The control block diagram of the printer 20 shown in FIG. 4 is described next. As shown in FIG. 4 the printer 20 has a display unit 110 including LEDs 23 for indicating errors in the printer 20, a printing unit 120, a paper cutting unit 130, a detection unit 140, a drive unit 150, and a control unit 200 connected to these other units and controlling the printer 20.

The printing unit 120 includes the paper storage unit 25 for storing roll paper P, the print head 122 (inkjet head in this embodiment), a paper feed unit 123 for conveying the roll paper P by means of a paper feed motor 124, and the ink supply unit 125 for supplying ink from an ink cartridge 126, and prints according to print data sent from the host 10.

The paper cutting unit 130 has the paper cutter 132 and the paper cutter motor 131 for driving the paper cutter 132, and cuts the roll paper P at a point trailing the printed area.

The detection unit 140 includes the cover sensor 142 for detecting if the cover 22 is open or closed, the paper sensor 143, and the remaining ink level sensor 144. The paper sensor 143 detects if roll paper P has been installed or removed from the paper storage unit 25, and senses the type of paper by means of an optical sensor (transmittance or reflectance) not shown. The remaining ink level sensor 144 detects how much ink is left in the ink cartridge 126.

The drive unit 150 includes a display driver 151, a head driver 152, and a motor driver 153 (feed motor driver 153a and cutter motor driver 153b), and controls driving each.

The control unit 200 includes a CPU 210, a ROM 220, a character generator ROM (CG-ROM) 230, a RAM 240, a flash ROM 250, and an input/output controller (IOC) 260 connected via an internal bus 270. ROM 220 has a control program block 221 for storing a program for controlling operation in each of the processing modes and programs executed by the CPU 210, and a control data block 222 for storing data tables and control data. The CG-ROM 230 stores character and symbol font data, and outputs the corresponding font data when the character code for a desired character or symbol is received. The CG-ROM 230 can be omitted depending on the processing capacity of the host 10.

RAM 240 is working memory and includes a work area block 241 used for storing flags, for example; a receive buffer 242 (similar to data receiving unit 42 in FIG. 3) for storing print data and commands received from the host 10; a send buffer 243 (similar to data transmission unit 50, FIG. 3) for storing status and response data for sending to the host 10; an error state mode block 244 (similar to selected mode memory 46, FIG. 3) for storing the value set by the error state mode selection command (see FIG. 5A) controlling the operating mode selected for the case when an error occurs; and print buffer 245 for storing image data for printing.

The flash ROM 250 has a startup mode block 251 (similar to selected mode memory 46, FIG. 3) for storing the startup mode selection command setting (see FIG. 5D), and a paper type data block 252 for storing data identifying the type of paper (continuous form, slip, special-purpose paper) identified by the detection result from the paper sensor 143. Note that by using flash ROM 250, the data is not erased when the power turns off. Note, further, that the paper type setting is not limited to the detection result from the paper sensor 143, and could be set by a DIP switch on the printer 20 or control data sent from the host 10.

The IOC 260 has logic circuits for complementing CPU function and handling interface signals exchanged with peripheral circuits, and is composed of a gate array, custom LSI device, or other device. The IOC 260 can pass print data and control data from the host 10 directly or after internal processing to the internal bus 270.

The CPU 210 takes signals and data from other parts of the printer 20 or from the host 10 through 10C 260, processes font data from the CG-ROM 230 and data in RAM 240 according to the control program stored in ROM 220, and then outputs signals and data to other parts of the printer 20 through 10C 260 to control mode selection and printing processes according to control commands sent from the host 10.

Some control commands sent from the host 10 to the printer 20 are described next with reference to FIG. 5. As shown in FIG. 5A, the error state mode selection command ESC A m1 m2 determines what process to run when an error occurs.

When m1=0 (first error state mode), the deletion processing mode is not activated when an error occurs. In this case, data that has not been printed yet and is still stored in receive buffer 242 and print buffer 245 is kept.

When m1=1 (second error state mode) when an error occurs, data that has not been printed yet and is still stored in receive buffer 242 and print buffer 245 is erased from memory, and the deletion processing mode is then activated, i.e., control is passed to the deletion processing mode controller 45.

When m1=2 (third error state mode), data that has not been printed yet and is still stored in print buffer 245 is erased from memory when an error occurs, but data that has not been printed and is stored in receive buffer 242 is kept, and the deletion processing mode is then activated.

It is therefore possible by changing the value of parameter m1 to select the appropriate error state mode according to the application type and desired print results, that is, an error state processing mode selection means is established. More specifically, by setting the first error state mode (m1=0), printing can be continued as desired. This is useful when it is known that the printout will not be broken into sections due to the error, that is, that printing can be continued without the printout being interrupted and broken into sections. It is therefore not necessary to send the print data again, and paper waste can be prevented.

Figure 8:
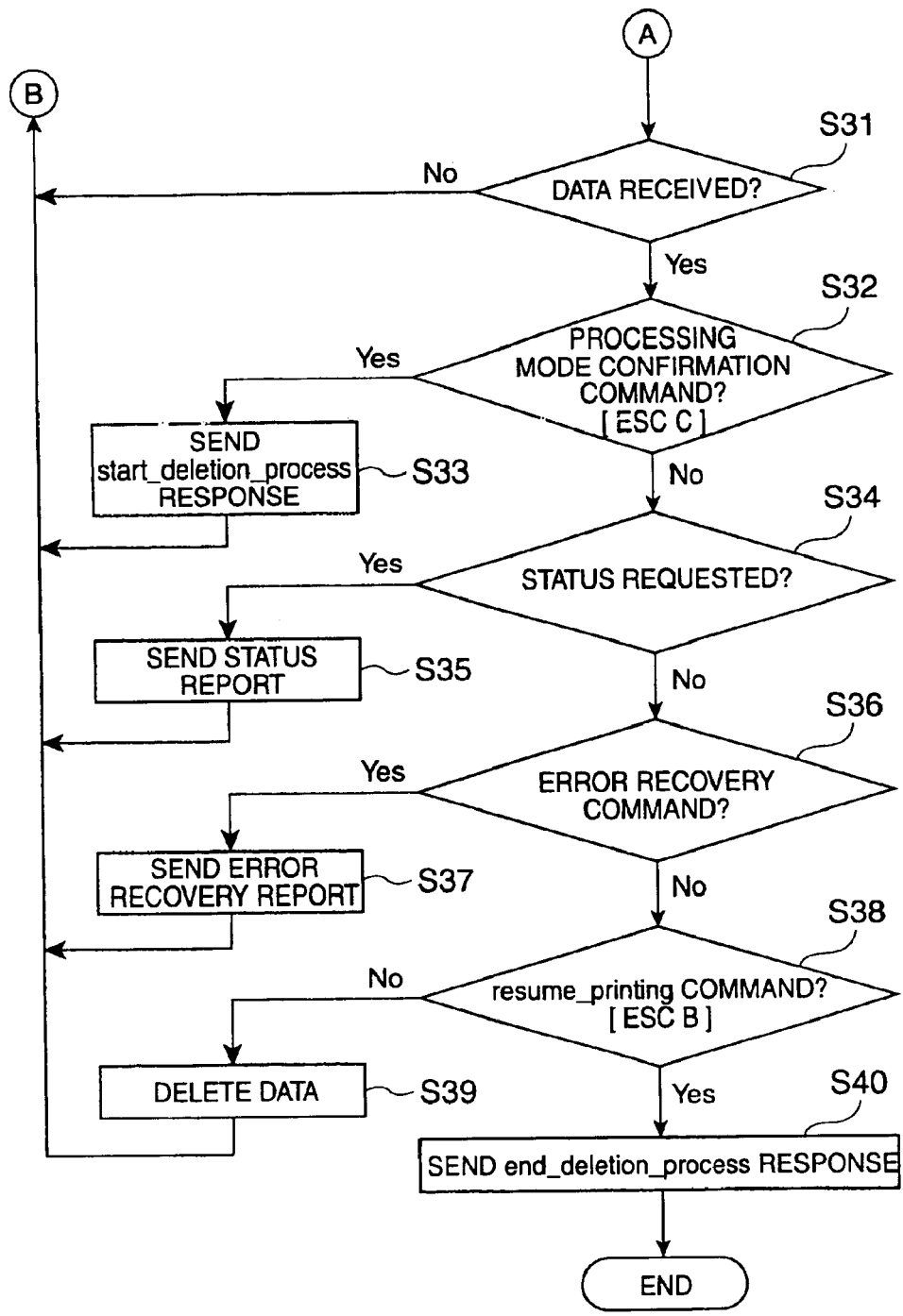
FIG. 8 is a continuation of the flow chart shown in FIG. 7.

Furthermore, if the second error state mode (m1=1) is selected, all data in the receive buffer 242 and print buffer 245 is cleared, and less time is required to clear the data buffers in the deletion processing mode (because the deletion processing mode checks the data in the receive buffer for any of the above mentioned specific commands before deleting data as will be explained in detail later with reference to FIG. 8). Furthermore, if an application that monitors the printer status is used, processing can be controlled while monitoring the printer status, and processing can be continued with no problem by sending a resume_printing command after a status report indicating the problem was corrected is received.

If the third error state mode (m1=2) is selected, the deletion processing mode is activated while retaining the data in the receive buffer 242. As a result, if a resume_printing command is contained in the data that was not stopped by the data transmission interrupt process of the host 10 when an error occurred, and data that was already sent (that is, data in the OS transmission buffer 512 of the host 10, the data buffer 531 of the POS server 30, and the receive buffer 242 of the printer 20), the normal processing mode can be resumed by the resume_printing command. Therefore, while the deletion process requires more time because the data in the receive buffer 242 is checked and deleted one byte at a time after the deletion processing mode is activated, even applications that do not monitor the printer status can resume processing with no problem.

Parameter m2 of the error state mode selection command ESC A m1 m2 specifies whether to send a response to the host 10 when the processing mode changes (a mode_change response selection means). If m2=0, a response is not sent to the host 10 when the processing mode changes in this embodiment. If m2=1, the start_deletion_process response is sent to the host 10 when the processing mode changes from the normal processing mode to the deletion processing mode, and the end_deletion_process response is sent when operation changes from the deletion processing mode to the normal processing mode.

By thus sending the start_deletion_process and end_deletion_process responses from the printer 20, the host 10 can know the current processing mode of the printer 20. The end_deletion_process response also confirms that the resume_printing command was processed normally.

Furthermore, because it is possible to elect whether to send a response to the host 10 when the processing mode changes, compatibility with applications that do not monitor the printer 20 status is possible by setting parameter m2=0 so that neither response is sent.

Instead of selecting the error state mode to be activated when an error occurs and whether to send a response when the processing mode changes by means of a command such as described above, it is alternatively possible to provide memory switches in the printer 20. In this case control data for resetting the appropriate memory switch can be sent from the host 10 to make the corresponding selections. The printer 20 could further alternatively be provided with DIP switches which are then set to make the corresponding selections.

The resume_printing command is described next with reference to FIG. 5B. As described above, the resume_printing command tells the printer to leave the deletion processing mode and resume the normal processing mode, and is represented by ESC B d1 . . . dk in this embodiment of the invention where d1 . . . dk is a character string such as FINISH or other desirable keyword or value. This keyword or value is stored in flash ROM 250 in the printer 20. By using a desirable keyword as the parameter, operating errors due to an accidental match can be avoided. In addition, when using an application that monitors the printer status, the application can manage returning to the normal processing mode by sending the resume_printing command at the appropriate time, and data that have not been printed can be reliably deleted. Furthermore, if the application does not monitor the printer 20 status, printing can be resumed from the page following the page that was being processed when the error occurred by adding the resume_printing command to the beginning of the print data. Yet further, by adding the resume_printing command immediately before command data that is to be unconditionally executed, such as a command to cut the roll paper P or a command to discharge the slip if slips are used as the printing medium, those commands can be reliably executed.

The processing mode inquiry command is described next with reference to FIG. 5C. The processing mode inquiry command ESC C m is used to confirm the current processing mode of the printer 20. Parameter m1 could be set to m1=1, for example. By sending this processing mode inquiry command before sending print data, for example, the host 10 can send data appropriate to the processing mode of the printer 20. This prevents sending print data when the printer 20 is in the deletion processing mode, and the resulting loss of the print data, for example. Furthermore, if the printer 20 has entered the deletion processing mode before the host application starts, the application might not receive the start_deletion_process response. However, by using this processing mode inquiry command, the application can determine if the printer 20 is in the deletion processing mode.

The printer 20 sends the start_deletion_process response or end_deletion_process response when queried by this processing mode inquiry command ESC C m. That is, if the printer 20 is in the deletion processing mode, it sends the start_deletion_process response, but if the printer 20 is in the normal processing mode, it sends the end_deletion_process response. By returning the same responses that are sent when the processing mode changes, the host 10 can use the same tasks and control processes appropriate to the processing mode.

The startup mode selection command is described next with reference to FIG. 5D. As described above, the startup mode selection command controls whether the printer 20 starts from the normal processing mode or from the deletion processing mode. This startup mode selection command is represented by ESC D m (startup processing mode selection means).

When parameter m=0, the printer starts from the normal processing mode. When parameter m=1, the printer starts from the deletion processing mode. By setting the printer to start from the deletion processing mode (m=1), unwanted data can be reliably cleared when, for example, the printer 20 restarts due to an operator error, for example, even though there is buffered data not yet printed, or spurious data is produced by the plug-and-play process when the host operating system boots up. Data that is output to determine what devices (terminal devices) are connected to the serial ports of the host 10 is one example of this unwanted data.

Furthermore, by enabling selecting whether to start from the normal processing mode or the deletion processing mode, incompatibility problems can be avoided when the host 10 (application) is not compatible with the deletion processing mode. It should be noted that because the value of this startup mode selection command determines the startup operation of the printer 20, it must be stored in flash ROM 250 or other nonvolatile memory.

Like the error state processing mode selection means and mode_change response selection means described above, this startup processing mode selection means can be configured using memory switches or DIP switches, for example.

Operation of the printer 20 and host 10 is described next below with reference to the flow charts in FIG. 6 to FIG. 13. FIG. 6 to FIG. 10 and FIG. 13 apply to use with an application that monitors the printer status, and FIG. 11 and FIG. 12 apply to use with an application that does not monitor the printer status.

Figure 6:
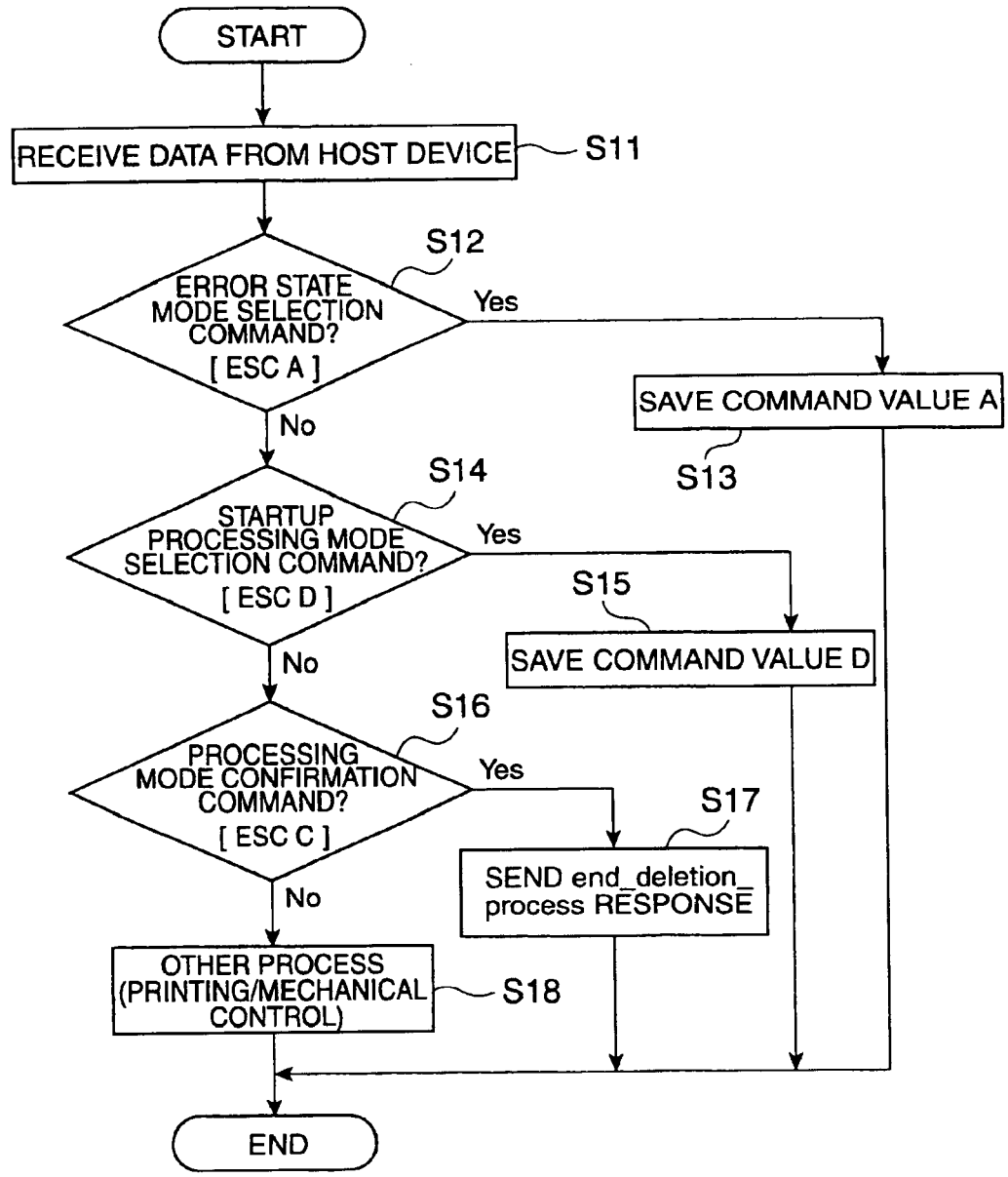
FIG. 6 is a flow chart of normal data processing by the printer, using an application that monitors printer status.

Operation of the printer 20 during normal data processing, that is, in the normal processing mode, is described first with reference to FIG. 6. As shown in FIG. 6, when the printer 20 receives data from the host 10 (S11), it determines if the error state mode selection command (ESC A) was sent (S12). If it was (S12 returns Yes), the command parameters m1, m2 are stored in error state mode block 244 (FIG. 4) (S13).

If the error state mode selection command was not received (S12 returns No), the printer 20 determines whether the startup mode selection command (ESC D) was received (S14). If it was (S14 returns Yes), the command parameter m is stored to startup mode block 251 (FIG. 4) (S15).

If the startup mode selection command is not received (S14 returns No), whether the processing mode inquiry command (ESC C) was received is determined (S16). If it was (S16 returns Yes), the end_deletion_process response is returned to the host 10 because the normal processing mode is currently active (S17), thus telling the host 10 that the printer 20 is in the normal processing mode. If the processing mode inquiry command was not received (S16 returns No), the received data is processed accordingly for printing control or mechanical control, for example (S18).

While not shown in the figure, it should be noted that if a resume_printing command is sent while the printer is in the normal processing mode due to an operator error, for example, the resume_printing command is deleted upon receipt.

Figure 7:
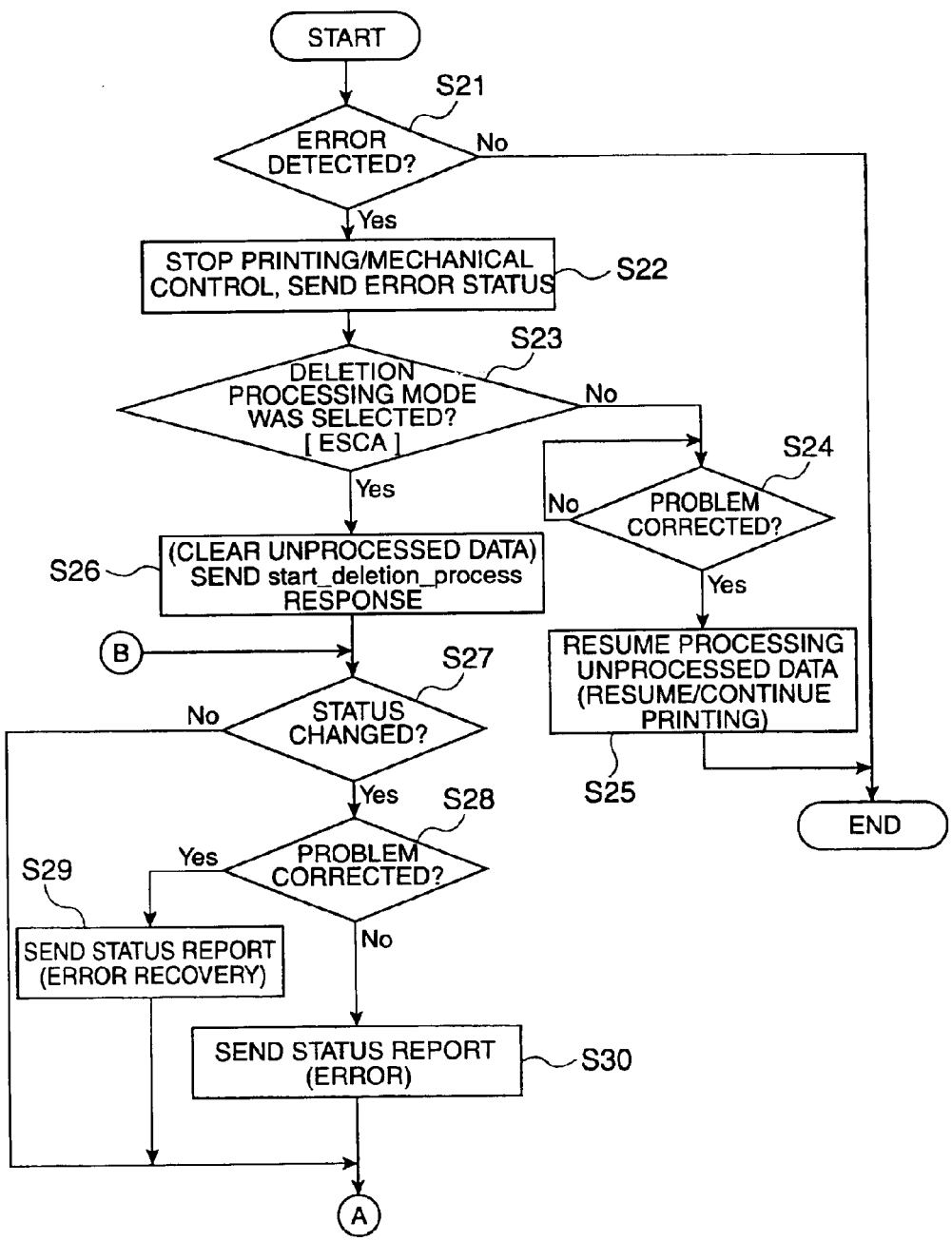
FIG. 7 is a flow chart of processing by the printer when an error occurs, using an application that monitors printer status.

Operation of the printer 20 when an error occurs is described next with reference to FIG. 7 and FIG. 8. Referring to FIG. 7, when the printer 20 detects an error (including a paper jam, open cover, no paper, no ink, or the detected paper type differs from the stored paper type) (S21 returns Yes), it stops printing control and mechanical control, drives the LEDs 23 to light steady or blink in order to show that an error occurred, and sends an error status to the host 10 (S22). The printer 20 also checks if activation of the deletion processing mode has been selected, that is, if the value m1=1 or 2 (see FIG. 5A) of the parameter m1 of the command ESC A is stored (S23). If not (i.e., m1=0 and S23 returns No), processing the unprocessed data (data that had not been printed) resumes (S25) after the error is resolved (S24 returns Yes). In this case, that is, if m1=0, data that had not been processed when the error occurred is not erased from memory and remains in memory, and printing can therefore continue from the data that was being printed when the error occurred.

However, if the deletion processing mode had been selected (S23 returns Yes) and m1=1, all unprocessed data in the receive buffer 242 and print buffer 245 is cleared, the start_deletion_process response is sent to the host 10, and the deletion processing mode is activated. If m1=2, however, the data in print buffer 245 is cleared but the unprocessed data in the receive buffer 242 is kept, the start_deletion_ process response is sent to the host 10 (unless the parameter m2 of the command ESC A is m2-0), and the deletion processing mode is activated (S26).

If there was a change in the printer status is then detected (S27). If a change is detected (S27 returns Yes), whether the change was a resolution of the error (problem) is detected (S28). If the error was corrected (S28 returns Yes), the error recovery status is sent to the host 10 (S29). However, if the change was that an error was detected (S28 returns No), the error status is sent to the host 10 (S30).

After the error recovery or error status is sent (S29 or S30), or if there is no state changed detected (S27 returns No), the printer 20 detects if there is any data from the host 10 in the received buffer 242 (S31). Referring now to FIG. 8, if data was received from the host 10 (S31 returns Yes), whether a processing mode inquiry command (ESC C) was received is determined (S32). If a processing mode inquiry command was received (S32 returns Yes), the printer 20 returns the start_deletion_process response because the deletion processing mode is currently active (S33).

If the processing mode inquiry command was not received (S32 returns No), whether a status request command was received is determined (S34). If it was (S34 returns Yes), the printer status is returned (S35). If the status was not requested (S34 returns No), whether an error recovery command was received is determined (S36). If the deletion processing mode was activated because of a paper jam or other recoverable error, for example, the printer sends an error recovery report to the host 10 after the paper jam is removed and the printer mechanism is reset (S37).

If an error recovery command was not received (S36 returns No), whether the resume_printing command ESC B was received is detected (S38). If not (S38 returns No), the received data is deleted (S39) and the process returns to step S27. If the resume_printing command was received (S38 returns Yes), the end_deletion_process response is returned, unless the parameter of command ESC A is m2=0, in which case no response is returned (s40). The deletion processing mode is then terminated and the normal processing mode resumed.

Because commands other than the specific commands described above (the processing mode inquiry command, status request command, error recovery command, and resume_printing command) are ignored when the printer is in the deletion processing mode, unprocessed data (data that the host 10 wants to delete) can be reliably deleted by activating the deletion processing mode by asserting the error state mode selection command with the corresponding parameters.

If the cause of the error (error state) has not been resolved when the resume_printing command is received and the normal processing mode is resumed, the persistence of the error will be detected by the first error detection step (S21 returns Yes), the start_deletion_process response will be sent again, and the deletion processing mode will be re-entered. This assures reliable error recovery by the printer 20. From responses received from the printer, the host 10 is able to know if the error (problem) persists, of that the resume_Printing command was processed normally.

Furthermore, if the operator can manually assert the resume_printing command, the resume_printing command could be asserted erroneously due to an operator error even though the problem causing the error has not been corrected. If the printer 20 is unable to send a response in such cases, previous start_deletion_process or end_deletion_process responses may remain unsent in the printer's send buffer 243. Responses could similarly accumulate if receiving responses and sending the processing mode inquiry command are started by different tasks. If the deletion processing mode is thus resumed when both previous responses remain in the send buffer 243 and the end_deletion_process response is unsent, both past responses are deleted and only the most recent start_deletion_process response is sent. This prevents sending previous start_deletion_process and end_deletion_process responses accumulated in the send buffer 243 to the host one right after the other. Therefore, the controller (CPU, for example) will not be overloaded by receiving multiple consecutive responses even when using an application that monitors the printer status infrequently.

Figure 9:
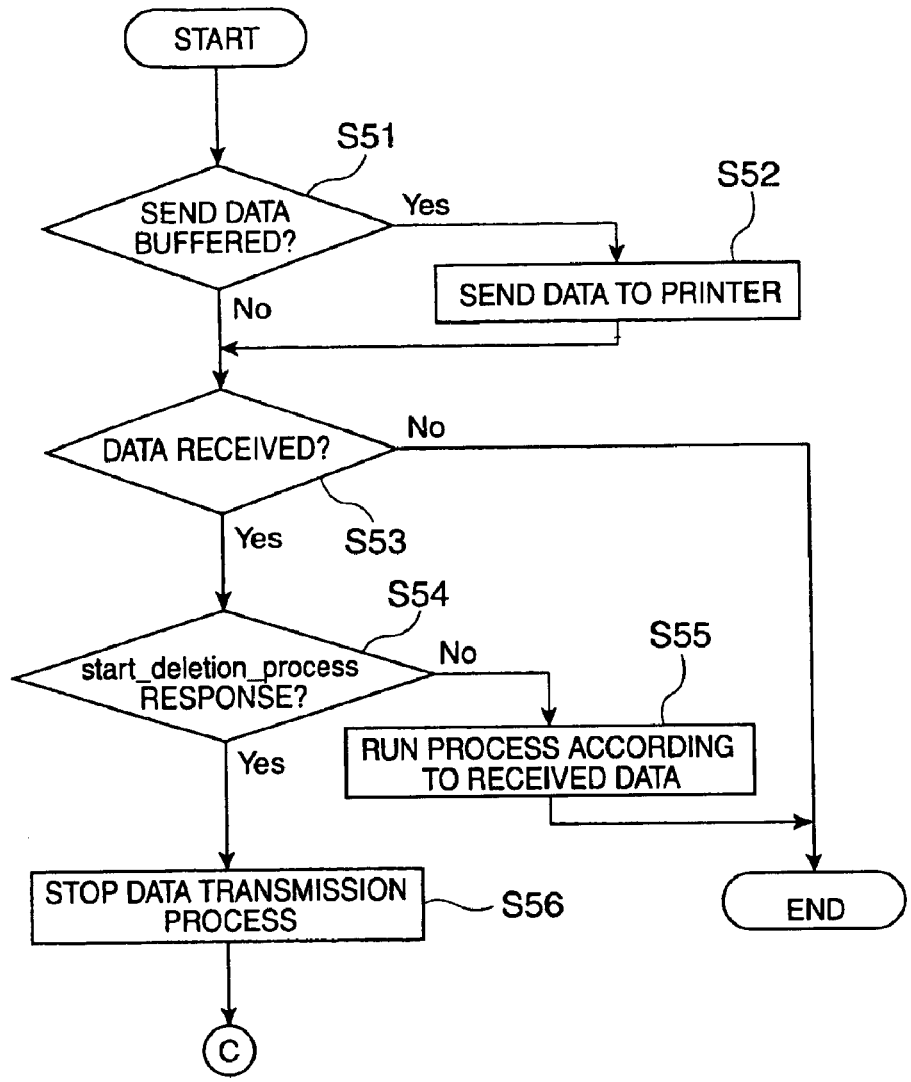
FIG. 9 is a flow chart showing processing by the host device, using an application that monitors printer status.

Operation of the host 10 is described next with reference to FIG. 9 and FIG. 10. As shown in FIG. 9, the host 10 detects if there is data to send to the printer 20 (S51), and if there is (S51 returns Yes), runs the data transmission process to send the data to the printer 20 (S52). The host 10 then detects if data was received from the printer 20 (S53), and if data was received (S53 returns Yes), determines if the start_deletion_process response was received (S54). If the start_deletion_process response was not received (S54 returns No), the process corresponding to the received data is run (S55). However, if the start_deletion_process response was received (S54 returns Yes), the host 10 knows that the printer 20 is in the deletion processing mode, and the host 10 therefore stops the data transmission process (S56).

Figure 10:
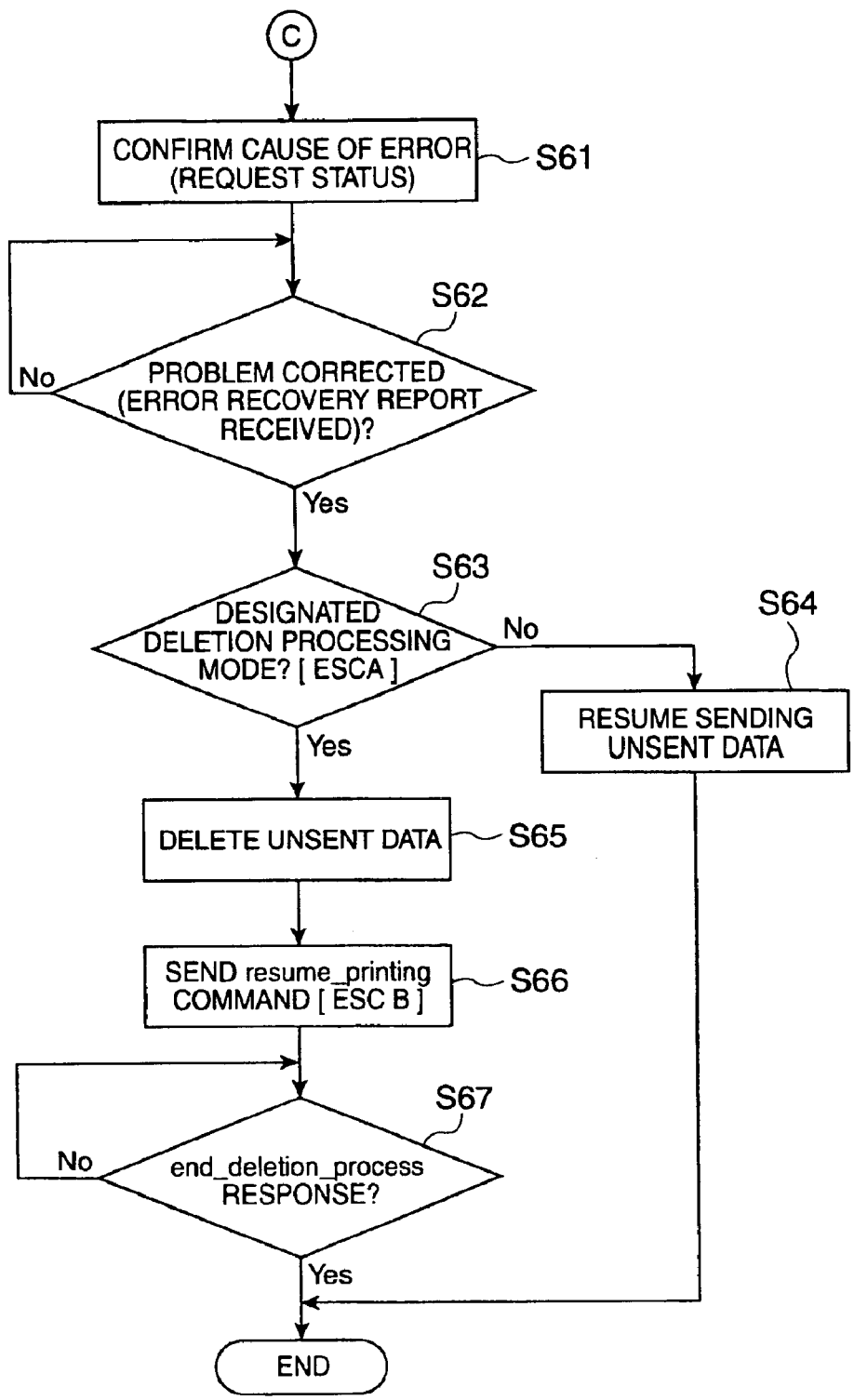
FIG. 10 is a continuation of the flow chart shown in FIG. 9.

If the data transmission process is stopped (S56), the host 10 sends the status request command to confirm the cause of the problem as shown in FIG. 10 (S61, except this step can be skipped if the problem is known). The host 10 then detects if the error recovery report was received from the printer 20 (S62). If not (S62 returns No), the host 10 waits for an error recovery report from the printer 20.

When an error recovery report is received (S62 returns Yes), the deletion processing mode setting is checked. More specifically, whether parameter m1 of the error state mode selection command ESC A is set m1=1 or m1=2 is determined (S63). If the deletion processing mode is not activated because m1=0 (S63 returns No), the transmission process is resumed for any unsent data (S64).

However, if the deletion processing mode was selected (S63 returns Yes), the unsent data is cleared (S65) and the resume_printing command ESC B is sent (S66). When the end_deletion_process response to the resume_printing command ESC B is received (S67 returns Yes), the host 10 knows that the printer 20 resumed the normal processing mode, and this process ends.

If the deletion processing mode was specified (m1=1 or 2) and the process then ends, the data that was being transmitted when the error occurred and transmission was terminated is resent from the beginning. However, if slips are being printed, data is resent from the beginning of the first page that was not printed completely based on the process ID response received before the error occurred. That is, if a process ID is inserted at the end of each page of print data, transmission can be resumed from the beginning of the page containing the next process ID based on the last process ID response received before the error occurred, and the printer 20 can resume printing from the beginning of that page.

If roll paper P is being used as the printing medium, this process ID response could be similarly used by inserting the process ID at the beginning of each line of print data. This enables printing to resume from the beginning of the line where printing was interrupted when an error occurred.

When slight irregularities in the printout do not pose any problem for the images or text strings that are being printed, this configuration makes it possible to minimize the amount of data that must be resent and therefore enables faster recovery and resumption of operation.

Furthermore, when an accurate printout is required, such as for sales receipts and transaction journals, it is also possible to force data transmission to resume from the beginning of the data that was being printed when printing was stopped.

Operation with an application that does not monitor the printer status is described next with reference to FIG. 11 and FIG. 12. While certain inconsistencies arise with the description of the host 10 and printer 20 in FIG. 2 to FIG. 4 in that the printer status is not monitored, other than that status and response information is not sent from the printer 20, and the resume_printing command is inserted to the data (print data and command data) generated by the application, operation is the same as when the printer status is monitored. Further description of control similar to FIG. 2 to FIG. 4 is therefore omitted below.

Figure 11:
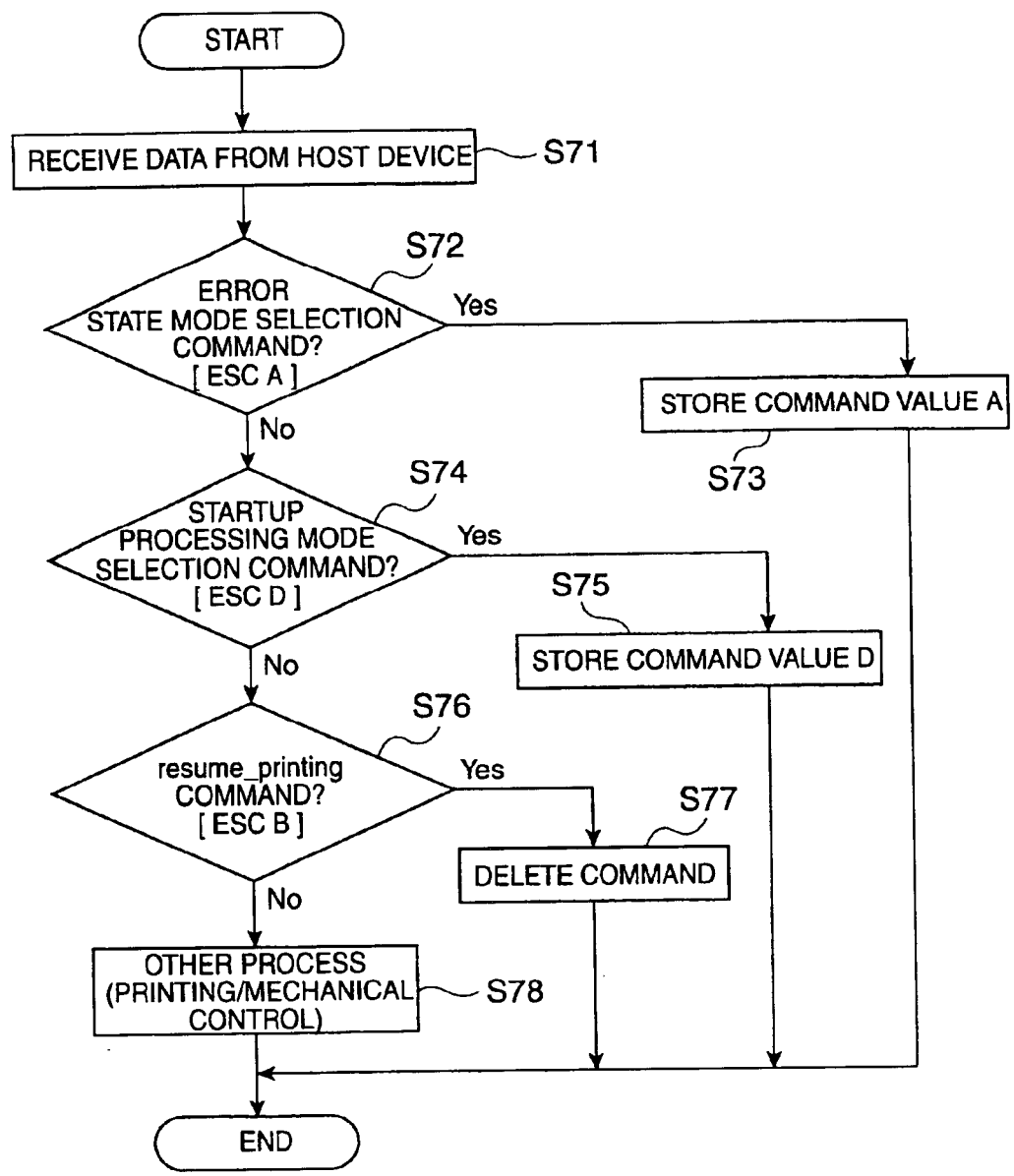
FIG. 11 is a flow chart of normal data processing by the printer, using an application that does not monitor printer status.
Figure 12:
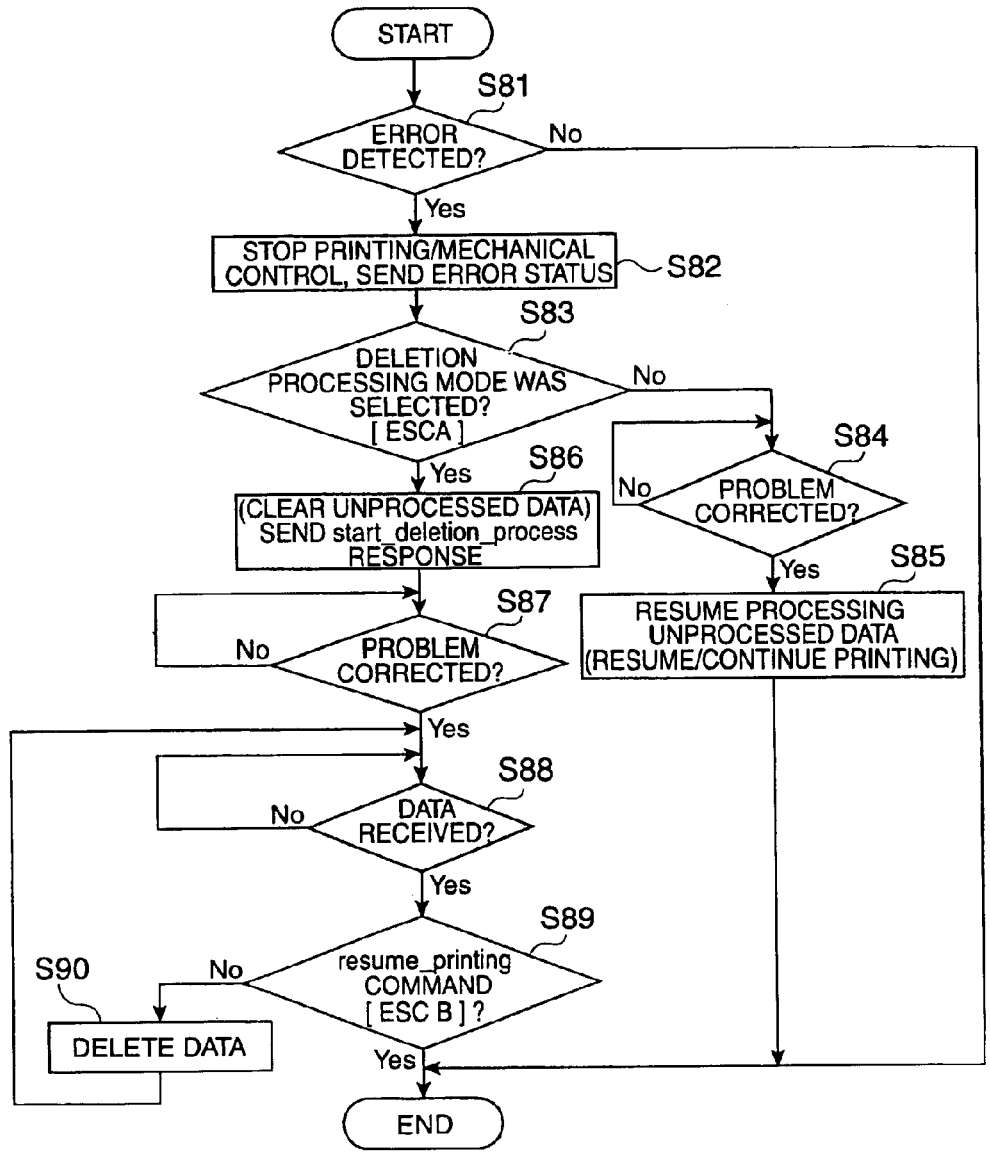
FIG. 12 is a flow chart of data processing by the printer when an error occurs, using an application that does not monitor printer status.

Processing by the printer 20 during normal data processing (i.e., in the normal processing mode) is described first with reference to FIG. 11. When the printer 20 receives data from the host 10 (S71), it determines if the error state mode selection command (ESC A) was received (S72). If it was (S72 returns Yes), it stores the command parameters m1, m2 (S73). When using an application that does not monitor printer status, as in the case shown in FIG. 11, command parameter m2 is preferably always set to m2=0 so that a mode change response is not sent (see FIG. 5A).

If the error state mode selection command was not received, the printer 20 determines whether the startup mode selection command (ESC D) was received (S74). If it was (S74 returns Yes), its command parameter m is stored (S75).

However, if the resume_printing command was received (S76 returns Yes), the resume_printing command is deleted (S77). If the received data was also not a resume_printing command (S76 returns No), the process appropriate to the received data is run (S78).

It will thus be apparent that when an application that does not monitor the printer status is used, the resume_printing command is embedded immediately before the print data or other data that is to be processed in any event, but the resume_printing command is deleted when the printer is in the normal processing mode so that the normal printing process runs.

Processing by the printer 20 when it is in the deletion processing mode and an error occurs is described next with reference to FIG. 12. When the printer 20 detects an error (including a paper jam, open cover, no paper, no ink, or the detected paper type differs from the stored paper type) (S81 returns Yes), it stops printing control and mechanical control (S82), and checks to see if the deletion processing mode selection is stored, that is, if the parameter m1 of command ESC A is m1=1 or 2 (see FIG. 5A) (S83). If no deletion processing mode is selected (i.e., m1=0) (S83 returns No), processing the unprocessed data is resumed (S85) after the problem is resolved (S84 returns Yes). In this case, that is, if m1=0, data that had not been processed when the error occurred is not erased from memory and remains in memory, and printing can therefore continue from the data that was printed when the error occurred.

However, if the deletion processing mode is selected (S83 returns Yes) and m1=1, all unprocessed data in the receive buffer 242 and print buffer 245 is cleared, and the deletion processing mode is activated. If m1=2, however, the data in print buffer 245 is cleared but the unprocessed data in the receive buffer 242 is kept, and the deletion processing mode is activated (S86).

Whether the problem or error was corrected is then detected (S87). If the problem was not corrected (S87 returns No), the printer 20 waits for the cause of the error to be resolved. If the problem has been corrected (S87 returns Yes), the printer 20 looks for data received from the host 10 (S88). If data was received (S88 returns Yes), whether a resume_printing command was received is detected (S89). If the received data is not a resume_printing command (S89 returns No), the data is cleared. If the resume_printing command was received (S89 returns Yes), the deletion processing mode is terminated and the normal processing mode resumed.

Even with applications that do not monitor the printer status, the printer therefore ignores all commands other than the resume_printing command when in the deletion processing mode. As a result, unprocessed data can be reliably deleted by specifying the deletion processing mode with the error state mode selection command.

As described above, even when using a program that does not monitor printer status, if the problem (error state) has not been resolved when the normal processing mode is resumed, the first error detection step will return an error (S81 returns), and the deletion processing mode will be immediately resumed.

Figure 13:
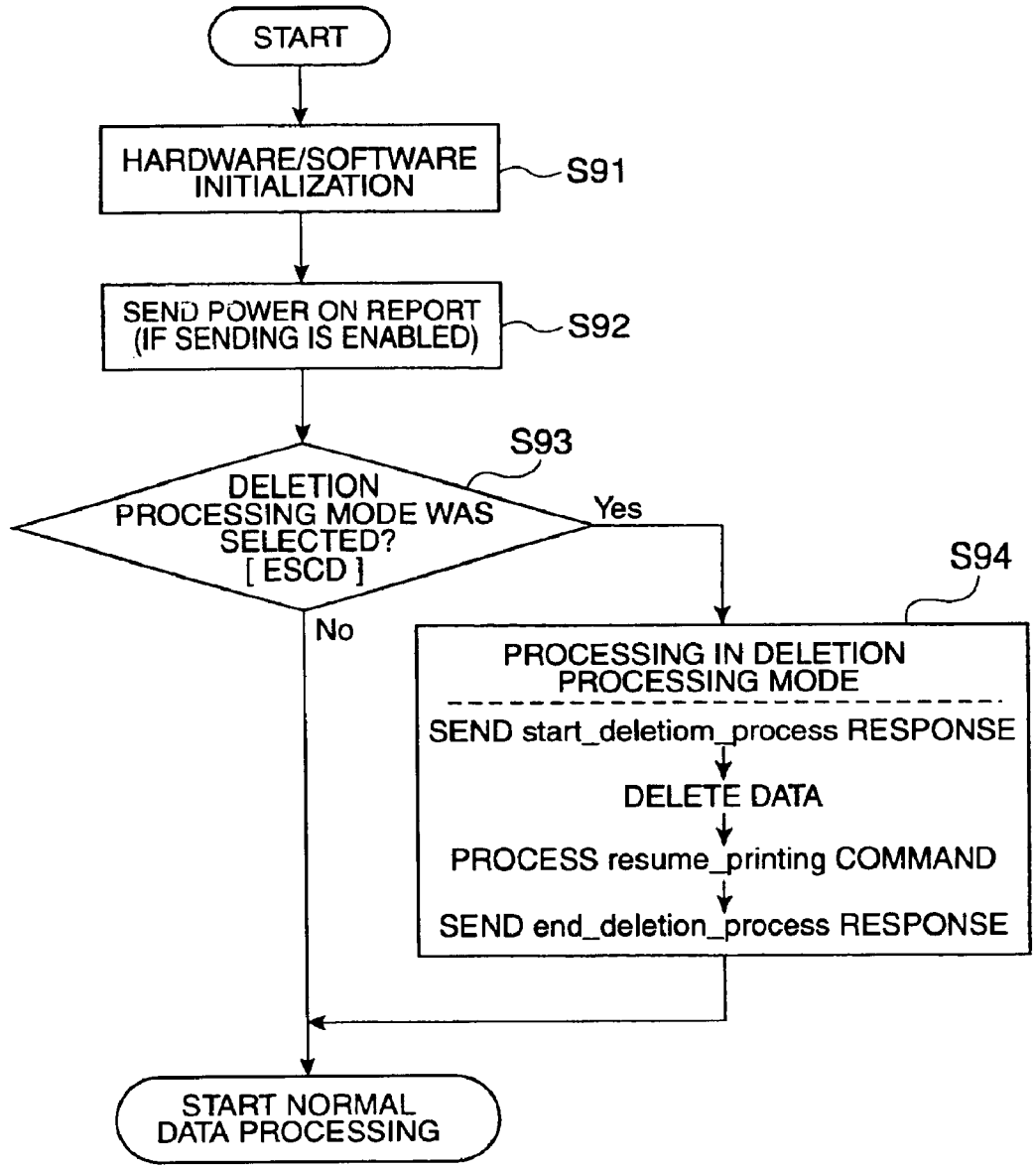
FIG. 13 is a flow chart of the printer startup process.
Figure 14A:
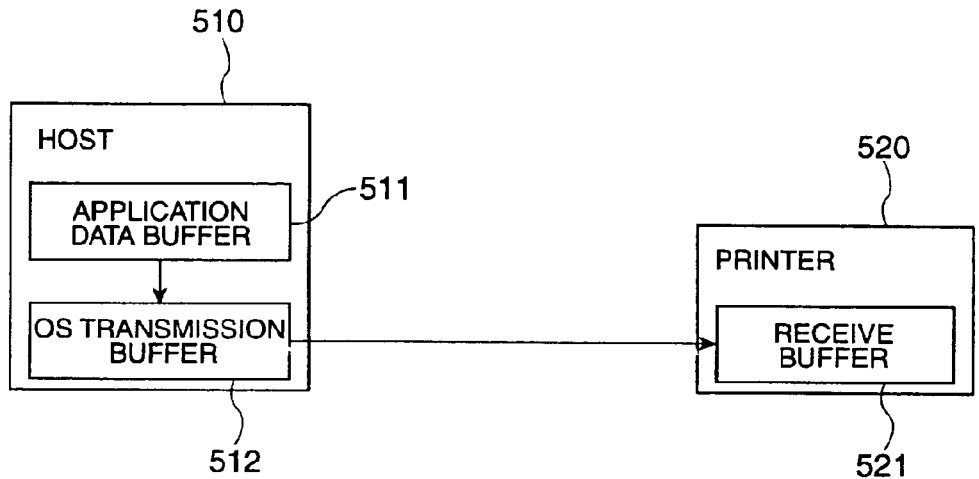
FIGS. 14a and 14b describe the prior art.
Figure 14B:
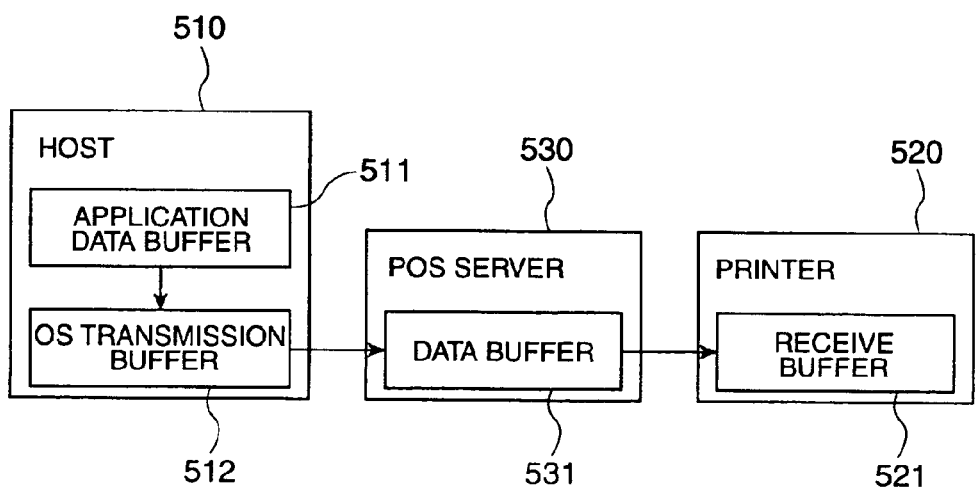

Processing by the printer 20 during printer startup is described next with reference to FIG. 13 with reference to an application that monitors the printer status. When the printer 20 is turned on, a hardware and software initialization process executes (S91) as shown in the figure, and the printer 20 sends a power-on report to the host 10 (S92, except that the power-on report is not sent if the printer is configured to not send the report).

Whether the deletion processing mode is specified is determined during startup (S93, startup mode selection command ESC D, see FIG. 5D). If the deletion processing mode is not specified (m=0) (S93 returns No), data processing proceeds normally. If the deletion processing mode is set (m=1) (S93 returns Yes), the process of the deletion processing mode is run (S94). More specifically, the start_deletion process response is sent to the host 10, and all data received from the host other than specific commands is ignored. When the resume_printing command is received from the host 10, the end_deletion_process response is returned, the deletion processing mode is terminated, and the normal processing mode is resumed.

By thus starting up in the deletion processing mode, unnecessary, extraneous data can be reliably cleared from memory, including when the printer is restarted due to an operator error even through print data was being transmitted, and when spurious data is generated by the plug-and-play initialization process of the host 10 OS.

It may also be that no error occurred during startup, in which case the printer 20 will not send an error recovery report. Therefore, the host 10 preferably sends the resume_printing command after confirming by means of the status request command that there is no error on the printer 20 side. The printer 20 could also be configured to automatically activate the normal processing mode when it has confirmed that data deletion has been completed (when data is not sent to the receive buffer 242 for a certain period of time).

As described above, when a printer error (off-line status or printer error) is detected by a printer 20 or printing system 1 according to the present invention, a deletion processing mode that clears unnecessary data is activated so that, when there is data left on the host 10 side that was processed before processing could be interrupted or data that is buffered but still not processed, unnecessary printing based on such data can be prevented. Furthermore, because the deletion processing mode is terminated when a resume_printing command is received from the host 10, such print data that has not been printed (that is, data that the host 10 wants to delete) can be reliably deleted.

Furthermore, by using a printer 20 according to the present invention, unnecessary data can be reliably deleted and wasteful printing can be prevented whether the application monitors or does not monitor the printer status.

Furthermore, the error state mode selection command can be configured to select an error state mode appropriate to the application type and user-desired print results. For example, if the first error state mode (m1=0) is selected, continuous print results can be achieved if the print mechanism does not cut (segment) the paper when an error occurs. This eliminates the need to resend the print data, and avoids wasting paper.

Yet further, if the second error state mode (m1=1) is selected, all data in the receive buffer 242 is cleared and then the deletion processing mode activated, and thus the time required for deleting the data is shorter than that required by the deletion processing mode to delete data. If the application monitors the printer status, processing can continue while the status reports from the printer 20 are being monitored, enabling control that does not embed the resume_printing command in the data to be deleted.

If the third error state mode (m1=2) is selected, the deletion processing mode is activated with data in the receive buffer 242. being left. As a result, the normal processing mode can be resumed by a resume_printing command when the resume_printing command is embedded in data that was already transmitted or data that the data transmission interrupt process of the host 10 was unable to stop. More time is therefore needed to delete data from the receive buffer 242, but even applications that do not monitor the printer 20 status can continue processing with no ill effects.

It should be noted that the present invention has been described using, by way of example, a printing system 1 composed of a host 10 and printer 20, but the invention is not limited to such a printing system. More specifically, the device controlled by the host 10 is not limited to a printer, and could be any type of device (printing apparatus) that has a printing function equivalent to that of a printer.

It will be obvious to one with ordinary skill in the related art that the system configuration and commands described above can be varied in many ways without departing from the scope of the present invention.

As described above, according to the present invention, the printer (printing apparatus) activates a deletion processing mode for clearing print data when the printer detects an error on the printer side, and ends the deletion processing mode when a resume_printing command is then received from a host device. As a result, data that is left on the host device because the data transmission interrupt process was too late, and data that was already buffered for processing, can be reliably cleared from memory. Unnecessary, wasteful printing can therefore be prevented.

What is claimed is:

1. A method of controlling a printing apparatus adapted to receive data composed of print data and control commands from a host device and to store the received data in a receive buffer, said printing apparatus being switchable between a normal processing mode and an error handling mode, wherein in the normal processing mode said printing apparatus processes all data in the receive buffer, said method comprising:

defining a deletion processing mode wherein said printing apparatus searches for execution one or more specific commands among said control commands within said receive buffer while deleting all other data from said receive buffer, said printing apparatus being effective for selectively activating said deletion processing mode;

having said printing apparatus switch to said error handling mode in response to it detecting an error while in said normal processing mode;

when switching from said normal processing mode to said error handling mode, having said printing apparatus select for activation one of a first, second or third error state mode;

wherein in said first error state mode, said printing apparatus does not erase any data in the receive buffer and in a print buffer, and maintains said deletion processing mode deactivated;

wherein in said second error state mode, said printing apparatus clears all data in the receive buffer and in the print buffer, and then activates the deletion processing mode; and wherein in said third error state mode, said printing apparatus clears all data in the print buffer and does not erase any data in the receive buffer, and then activates the deletion processing mode.

2. The method of claim 1, wherein one of said one or more specific commands is a resume_printing command causing the printing apparatus to switch from the error handling mode to the normal processing mode and to deactivate the deletion processing mode if it is currently activated, the method further comprising:

discarding any resume_printing command received while the printing apparatus is in the normal processing mode.

3. The method of claim 1, wherein one of said one or more specific commands is a resume_printing command causing the printing apparatus to switch from the error handling mode to the normal processing mode and to deactivate the deletion processing mode if it is currently activated, the method further comprising:

if the deletion processing mode was deactivated when switching from the error handling mode to the normal operating mode in response to the resume_printing command, then returning to the error handling mode and reactivating the deletion processing mode if the error has not been resolved at the transition from the error handling mode to the normal processing mode.

4. The method of claim 1, further comprising:

selecting whether the normal processing mode or the deletion processing mode is activated when the printing apparatus starts operating.

5. The method of claim 1, further comprising the following steps:

e) sending a start_deletion_process notification to the host device at the activation of the deletion processing mode; and f) sending an end_deletion_process notification to the host device at the deactivation of the deletion processing mode.

6. The method of claim 5, further comprising:

selecting whether to enable or disable any combination of step e) and step f).

7. The method of claim 5, wherein the start_deletion_process notifiction and end_deletion_process notification are stored in a transmission buffer before actually being sent to the host device; and wherein step e) further comprises deleting past notifications from the transmission buffer if the deletion processing mode is resumed when a past start_deletion_process notification and end_deletion_process notification remain buffered in said transmission buffer and unsent, and sending only the most recent start_deletion_process notification.

8. The method of claim 2 further comprising, on the side of the host device, the step of:

h) adding the resume_printing command to the beginning of print data.

9. The method of claim 2 further comprising, when the printing apparatus prints on slips as the printing medium;

i) adding the resume_printing command to the beginning of the print data for each slip, or immediately before a command instructing slip insertion.

10. The method of claim 2 further comprising, when the printing apparatus prints on slips as the printing medium:

i) adding the resume_printing command immediately before a command instructing slip discharge, and j) when the printing apparatus prints on continuous paper as the printing medium, adding the resume_printing command immediately before commands instructing cutting the continuous paper.

11. The method of claim 8 further comprising, on the side of the host device, the steps of:

k) stopping data transmission to the printing apparatus and deleting unsent data when a start_deletion_process notification is received; and l) sending the resume_printing command to the printing apparatus after confirming error recovery by the printing apparatus.

12. The method of claim 5, further comprising:

m) having the host device send a processing mode inquiry command to the printing apparatus to confirm the processing mode of the printing apparatus; and n) having the printing apparatus respond to the processing mode inquiry of step m) by sending the start_deletion_process notification to the host device when the deletion processing mode is active, and sending the end_deletion_process notification to the host device when the normal processing mode is active.

13. A program for executing on a computer the control method of claim 1.

14. A data storage medium for recording a program for executing on a computer the control method of claim 1.

15. A printing apparatus comprising means for executing the method of claim 1.

16. A printing system composed of the printing apparatus of claim 15 and a host device.

17. A printing system including of a printing apparatus and a host device and comprising means for executing the method of claim 8.

* * * * *